United States Patent
Okuda

(10) Patent No.: US 6,579,173 B1
(45) Date of Patent: Jun. 17, 2003

(54) GAME SCORE DETERMINATION APPARATUS AND METHOD

(75) Inventor: Jinichiro Okuda, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/504,880

(22) Filed: Feb. 16, 2000

(30) Foreign Application Priority Data

Feb. 16, 1999 (JP) ............................................. 11-037154

(51) Int. Cl.[7] ........................ A63F 13/00; G06F 155/00
(52) U.S. Cl. .............................................. 463/6; 700/92
(58) Field of Search ............................. 463/1–4, 8–15, 463/30, 31, 43, 6, 5, 7, 59–60; 700/91–93; 340/323 R

(56) References Cited

U.S. PATENT DOCUMENTS

| | | | | |
|---|---|---|---|---|
| 5,083,271 A | * | 1/1992 | Thacher et al. ............. | 364/411 |
| 5,283,733 A | * | 2/1994 | Colley ......................... | 364/411 |
| 5,711,715 A | * | 1/1998 | Ringo et al. ................... | 473/9 |
| 5,743,533 A | * | 4/1998 | Wiles et al. ................. | 273/371 |
| 5,746,656 A | * | 5/1998 | Bezick et al. ................. | 463/42 |
| 5,971,849 A | * | 10/1999 | Falciglia ...................... | 463/16 |
| 6,224,485 B1 | * | 5/2001 | Dickinson et al. ............ | 463/30 |

\* cited by examiner

*Primary Examiner*—Kim Nguyen
(74) *Attorney, Agent, or Firm*—Finnegan, Henderson, Farabow, Garrett & Dunner, L.L.P.

(57) ABSTRACT

A game apparatus is disclosed that retains a player's game score, regardless of whether the player is a skilled player or a beginner. The game apparatus performs ranking under circumstances that are fair to both skilled players and beginners. The game apparatus is premised on a fact that a most recent game score of a most recent player is always retained and, because the game apparatus is constituted so as to be fair to beginners and skilled players alike, in storing the most recent score a temporally oldest game score, having a ranking outside of a prestige ranking, is replaced by the most recent score. A ranking display in connection with the game apparatus is not biased toward the skilled player and can be enjoyed even by a beginner.

3 Claims, 8 Drawing Sheets

FIG. 3

| ORDER | NAME | TIME | GAME DATE |
|---|---|---|---|
| | RANKING | | |
| 1 | KENTARO SEGAWA | 1'24"09 | 2/22/98 |
| 2 | MT | 1'24"55 | 1/28/98 |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |
| 21 | | | |
| 22 | | | |
| 23 | | | |
| 96 | | | |
| 97 | | | |
| 98 | | | |
| 99 | | | |
| 100 | "EXECUTIVE DIRECTOR" | 2'54"09 | 2/16/99 |

FIG. 4

| ORDER | NAME | TIME | GAME DATE |
|---|---|---|---|
| | RANKING | | |
| 1 | KENTARO SEGAWA | 1'24"09 | 2/22/98 |
| 2 | MT | 1'24"55 | 1/28/98 |
| 3 | | | |
| 4 | | | |
| 5 | | | |
| 6 | | | |
| 7 | | | |
| 8 | | | |
| 9 | | | |
| 10 | | | |

YOUR SCORE

| 121 | "EXECUTIVE DIRECTOR" | 2'54"09 | 2/16/99 |
|---|---|---|---|

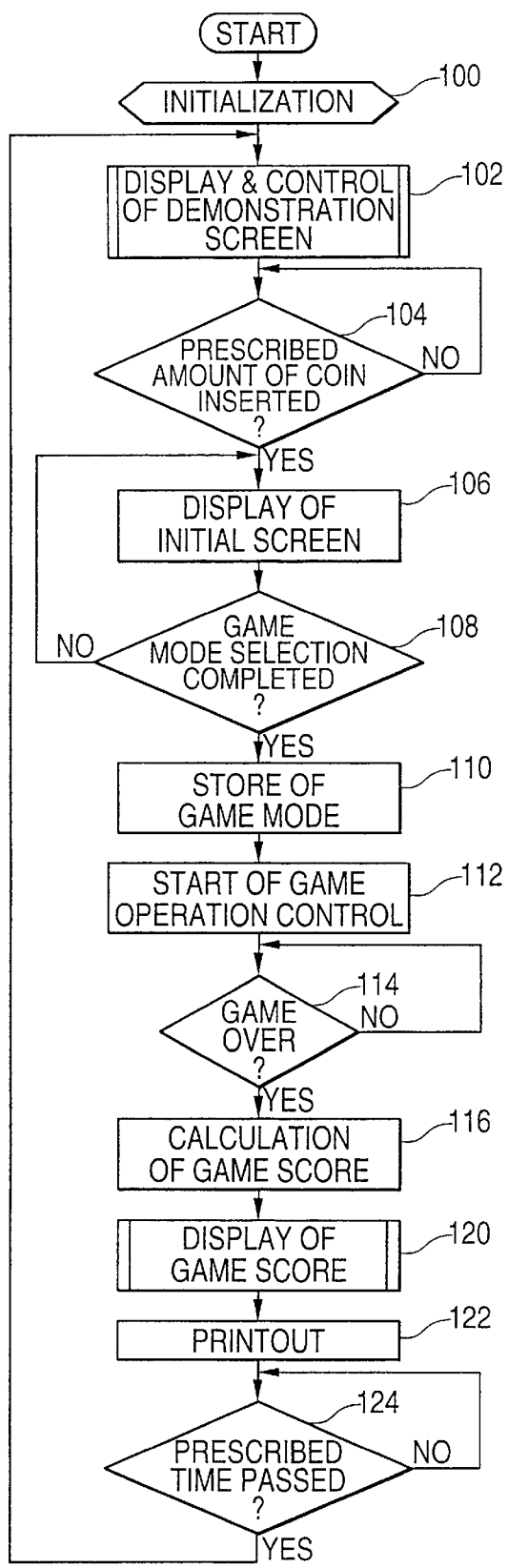

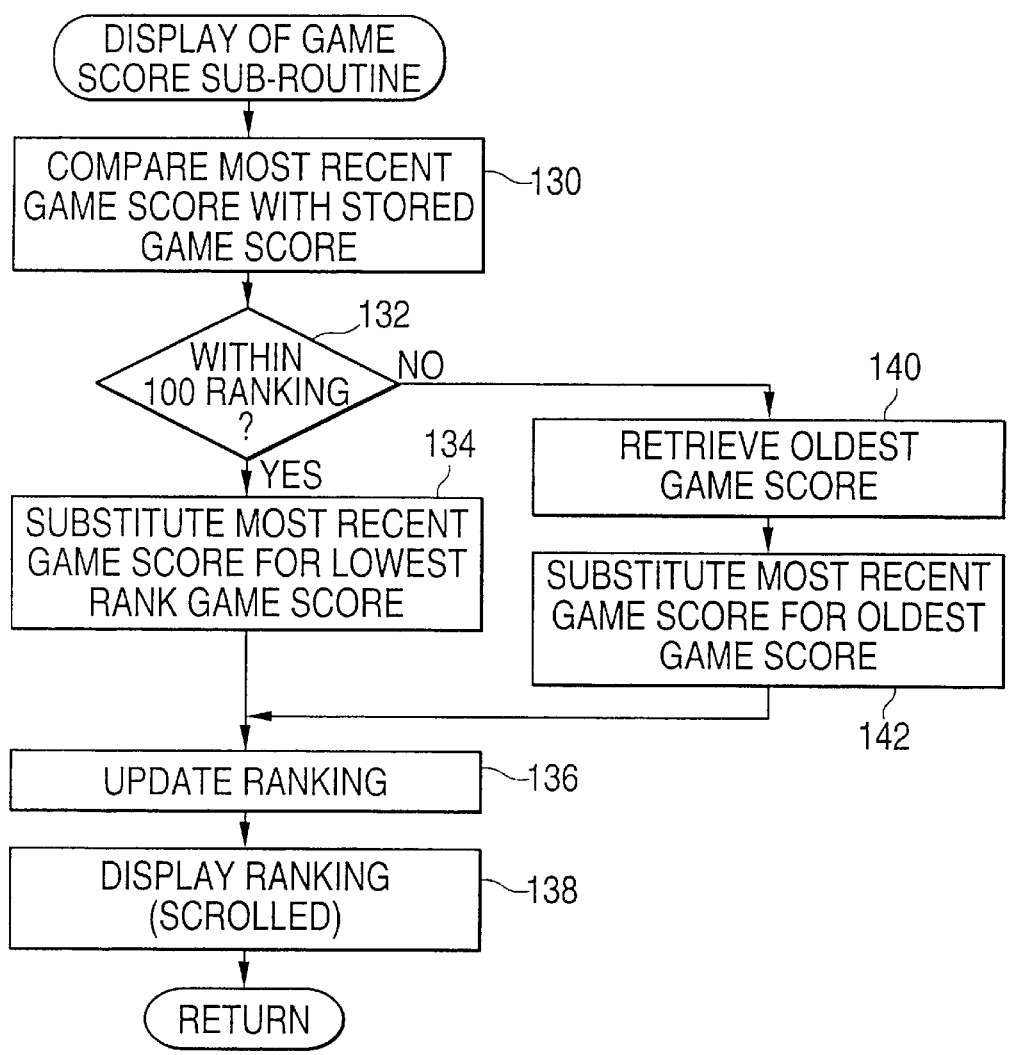

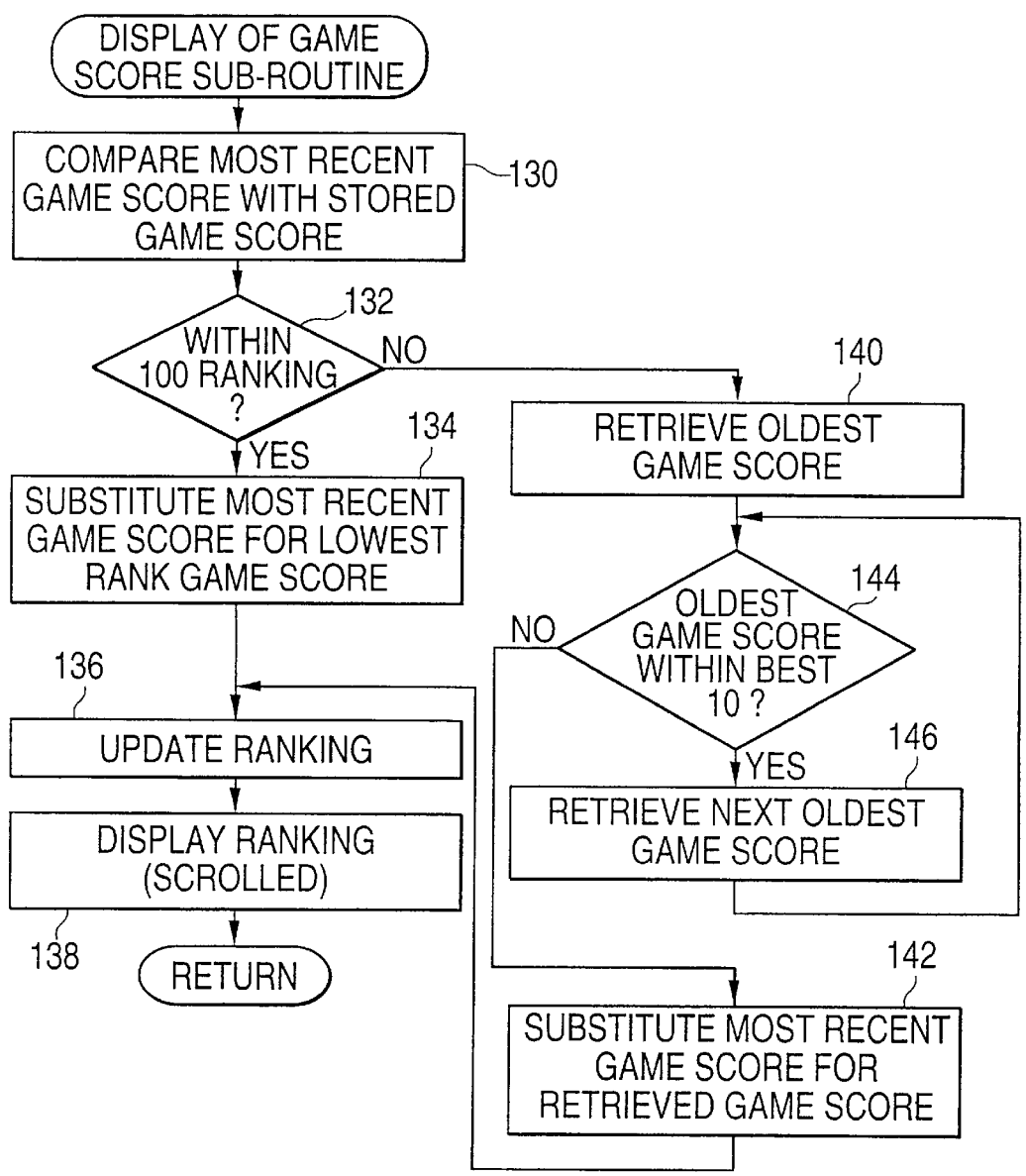

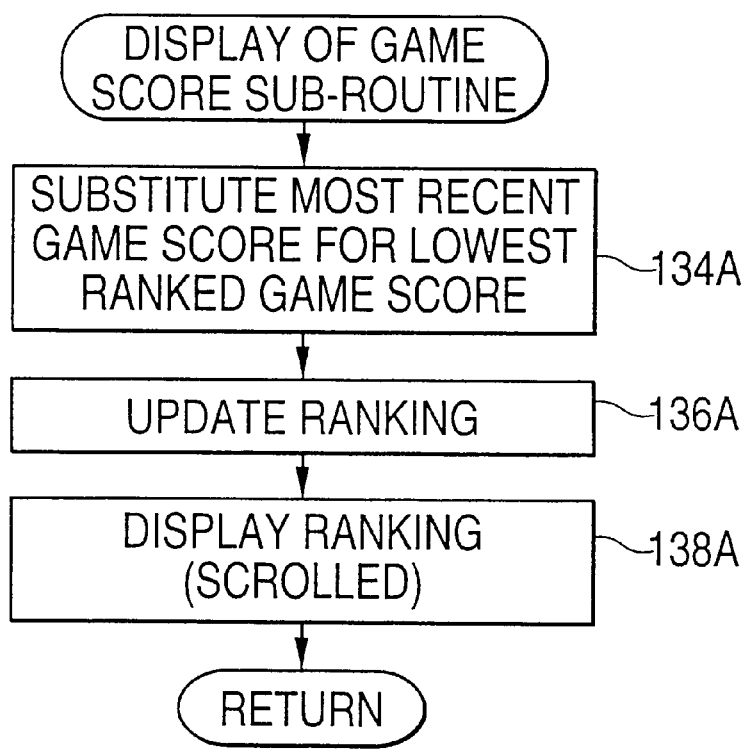

GAME SCORE DETERMINATION APPARATUS AND METHOD

BACKGROUND OF THE INVENTION

1. Field of the Invention

The present invention relates to a game apparatus, and more particularly to an improvement to a game score display system of a game apparatus.

2. Description of the Related Art

In a game apparatus, there are a wide variety of simulation games, in which a specific character is manipulated to achieve the objective of the game thereof. In car racing games in particular, settings are constituted just like the cockpits of real race cars. Accordingly, a player sits down in a seat, grasps a steering wheel, and, while viewing a course displayed on a monitor in front of him, can operate a steering wheel, accelerator, brake, and gear shift, making it possible to enjoy a game while experiencing a so-called virtual reality sensation. Furthermore, in a conventional game apparatus, a seat in which a player sits is capable of tilting in accordance with a travel state (horizontal gravity (G)) and vibrating from the reactive force from a road surface, making possible an experience that is closer to actual driving.

For this reason, a player is extremely interested in the extent of his real abilities, that is, in the game score.

Conventional ranking display systems in a game apparatus are constituted as follows. For example, in a car racing game apparatus, the total lap time and total number of laps of a course are computed upon completion of a game. The computation value thereof is treated as a game score, and it is determined whether or not this score value falls within a prescribed ranking. When it is determined that a particular player's game score falls within a particular ranking; the ranking display system transitions to a player name entry mode, in which the display system processes input symbols corresponding to a player's name or some other set of symbols with which the player represents himself. When this processing is complete, the game score is displayed beside the inputted symbols thereof in a game score order. Conversely, when it is determined that a game score is outside a ranking, the game ends without transitioning to a player name entry mode.

In a conventional game apparatus, since the game scores of only a limited number of top scorers are stored, there remains a ranking of only those players, who obtain a superior score in a game and the score of a player, whose game score is not retained in a ranking, such as a player unskilled in a game, is neither displayed nor stored. This is a problem in that only limited players increase their interest and desire to challenge a game, and it is not possible to heighten the interest of a player, such as a beginner, who is not accustomed to the game apparatus, nor is it possible to increase the number of players who choose to play the game. By contrast thereto, due to limited storage capacity, it is difficult to store and display the scores of all players. Further, arranging all players' scores without regard to score makes it impossible to accurately compare individual scores, thereby lessening a skilled player's interest in the game.

To solve these problems, an object of the present invention is to provide a game apparatus, which can retain a player's game score, regardless of whether the player is a skilled player or a beginner. A game apparatus consistent with the present invention also performs ranking under circumstances that are fair to both skilled players and to beginners.

SUMMARY OF THE INVENTION

To achieve these objects, the present invention is a game apparatus, comprising game executing means for manipulating a control portion and suitably moving a character displayed on a monitor in accordance with predetermined game rules, thereby achieving an objective based on the above-mentioned game rules. The game apparatus is characterized in that it has game score computing means, for computing a game score after an objective has been achieved using the game executing means; game score storing means for storing based on a prescribed ranking a prescribed limited number of game scores computed using the game score computing means; and substituting means for substituting the most recent game score by substituting a most recently executed game score for one of the stored game scores within the above-mentioned prescribed limited number, regardless of the ranking of the game score thereof.

According to the present invention, when the most recent game is completed, even in cases such that a prescribed limited number of game scores are already stored, and the most recent game score either is lower than the ranking of the game scores, or falls outside the ranking, because the present invention is constituted such that this most recent game score is stored by substituting the most recent game score for one of the stored game scores, even if the most recent player is a beginner, his score is stored, and can be displayed within a ranking. As a result thereof, even a beginner will take a heightened interest in a game, and the desire to challenge a game again can be elicited in numerous players.

Another aspect of the present invention is characterized in that, in a case, wherein the abovementioned prescribed limited number is exceeded when a game score is stored by the above-mentioned game score storing means, the above-mentioned substituting means deletes the temporally oldest game score, and stores the above-mentioned most recent game score.

Consequently, because a stored game score, which is replaced in accordance with the above-mentioned substituting means, is selected on the basis of being the temporally oldest game score, the player, whose score is replaced, understands and acquiesces to the fact that it is the oldest game score. Therefore, a player does not feel like this is unfair.

Yet another aspect of the present invention is characterized in that, when the above-mentioned temporally oldest game score is ranked higher than a prescribed game score, the next oldest game score is deleted.

Furthermore, as for another aspect of the present invention, even though a game score is old, when this old game score is ranked high, it is necessary to consider retaining the highly-ranked game score in memory for the sake of prestige. Accordingly, when a selected oldest game score is greater than a prescribed ranking (for example, within the best ten), a game apparatus consistent with the present invention makes the next oldest game score thereto the target of substitution, and repeats this process, targeting for substitution the oldest game score of those scores less than a prescribed ranking.

Yet another aspect of the present invention is characterized in that when the above-mentioned substituting means stores a game score using the above-mentioned game score storing means, the substituting means deletes a game score that is ranked the lowest, and stores the above-mentioned most recent game score.

In this aspect, because a stored game score, which is replaced in accordance with the above-mentioned substituting means, is selected on the basis of being the game score that is ranked the lowest, the player, who is replaced, wants to strive for an even higher score, so that even if the most recent game score should be worse than the lowest ranked game score thereof, the above-mentioned player can accept this fact as being fair.

Furthermore, another aspect of the present invention also involves game score displaying means for sorting and displaying, in accordance with a prescribed item of this game score, a game score that is stored in the above-mentioned game score storing means.

According to the present invention, when a game score is displayed by game score displaying means after the most recent player completes a game, because the name of the most recent player thereof is always displayed, it is possible to heighten a player's interest in the game. Furthermore, another aspect of the present invention also involves printout means for printing out a most recent game score and a prescribed number of game scores within the scope of the above-mentioned prescribed limited number.

According to the present invention, when a game score is printed out by printout means after the most recent player completes a game, because the name of this most recent player is always printed out together with a stored game score, it is possible to heighten a player's interest in the game. Furthermore, the number of stored players printed out is not limited to all that are stored, and a printout number prescribed beforehand, such as a ranking near the most recent player, a higher ranking, and so forth, can be set.

Furthermore, another aspect of the present invention is a system for displaying a score, comprising processing means for ranking and displaying a limited prescribed plurality of game scores, the display system being characterized in that processing means thereof has means for determining a game score ranking from a plurality of game scores, and display processing means for storing a game score ranking thereof, and displaying the game score on display means, and is constituted so that even when an executed game score falls outside of a the predetermined ranking, an executed game score is substituted for a specific game score within a ranking, a ranking comprising the executed game score is newly determined, and the ranking thereof can be displayed on display means. Furthermore, the present invention may be an electronic game apparatus comprising this system, and it may further comprise a storage medium, on which is stored a program for executing the display system thereof on an electronic game apparatus.

Furthermore, another aspect of the present invention is a game apparatus having a first memory for storing a game program and game progress controlling means for controlling the progress of a game on the basis of a game program stored in this first memory, the game apparatus being characterized in that it has game score computing means for computing a game score of the above-mentioned game when the state of progress of the above-mentioned game, the progress of which is being controlled by the above-mentioned game progress controlling means, satisfies a prescribed condition; game score storing means for storing a prescribed number's worth of game scores computed by the above-mentioned game score computing means; substituting means for replacing one score stored in the above-mentioned game score storing means with a score that the above-mentioned game score computing means computed last, when the game scores stored in the above-mentioned game score storing means reach a prescribed number's worth; and ranking means for attaching a rank to the above-mentioned stored respective game scores after the above-mentioned substituting means substitutes the above-mentioned most-recently computed game score in the above-mentioned game score storing means. In this aspect of the present invention, the computing of a game score is performed without being especially limited to when an entire game is completed, or when a certain game stage of a game comprising a plurality of stages is completed, or when each game stage is completed.

BRIEF DESCRIPTION OF THE DRAWINGS

FIG. 3 is a front view showing a ranking display screen on a monitor related to this aspect of an embodiment consistent with the present invention;

FIG. 4 is a front view of a form on which a ranking is recorded;

FIG. 5 is a flowchart of the motion control of a racing game apparatus related to this aspect of an embodiment consistent with the present invention;

FIG. 6 is a control flowchart showing a game score display subroutine;

FIG. 7 is a control flowchart showing an example of a variation of a game score display subroutine; and FIG. 8 is a control flowchart showing an example of a variation of a game score display subroutine.

DESCRIPTION OF THE PREFERRED EMBODIMENTS

Figure 1:
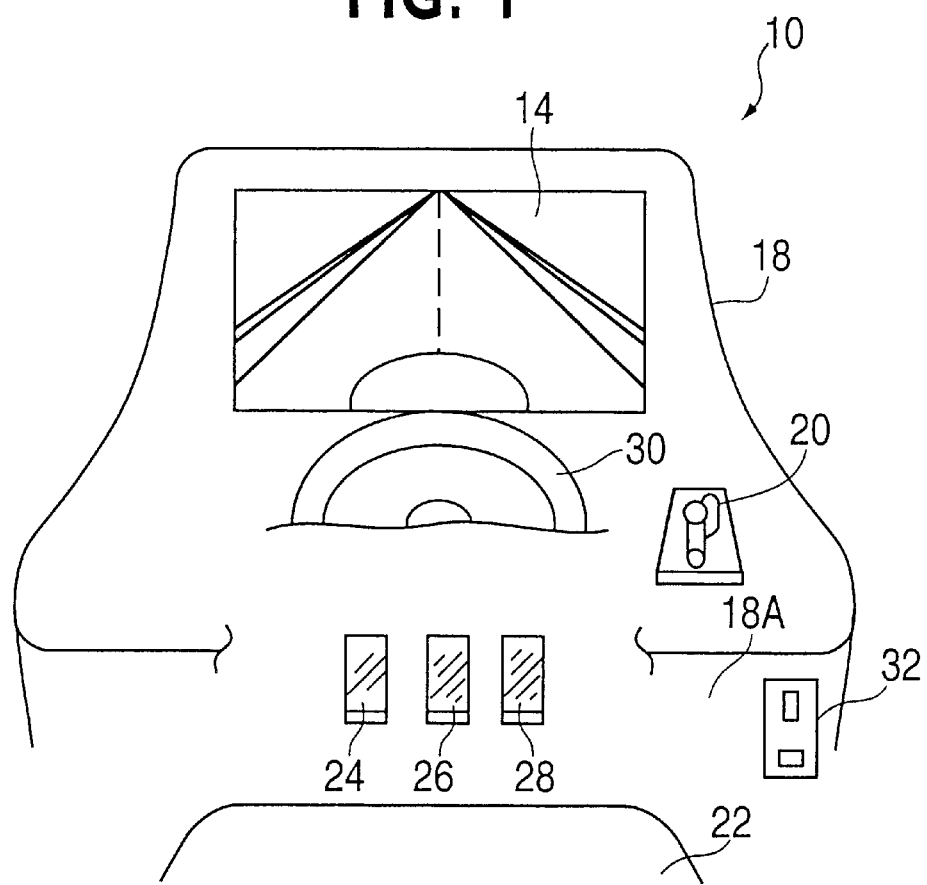
FIG. 1 is an external view, as seen from the front, of a racing game apparatus related to this aspect of an embodiment of the present invention.

FIG. 1 shows a car racing game apparatus 10 (hereinafter referred to simply as a racing apparatus 10), which is related to an aspect of an embodiment of a game apparatus consistent with the present invention.

Racing apparatus 10 thereof is installed in an urban area game center or the like as a so-called arcade game. A monitor 14 is provided on the front surface of the racing apparatus 10.

Further, a shift knob 20 is provided in FIG. 1 on the right side of a housing 18, which supports the abovementioned monitor 14 and so forth. Furthermore, shift knob 20 is used only at manual operation, and becomes unnecessary when automatic operation is selected. On an inner side of seat 22 in which a player sits, in order from the left side, a clutch pedal 24, brake pedal 26, and accelerator pedal 28 are arranged on the bottom portion of housing 18, and are constituted so as to correspond respectively to the tips of the right and left feet of a sitting player. Furthermore, steering wheel 30 is positioned in front of the monitor, and, by sitting in the seat 22, a player can experience the ambiance of sitting in the cockpit of a race car.

When a player plays with racing apparatus 10, racing apparatus 10 is constituted so that a game can be started by inserting a coin of a prescribed value into coin slot 32 provided on the wall portion 18A of housing 18.

Figure 2:
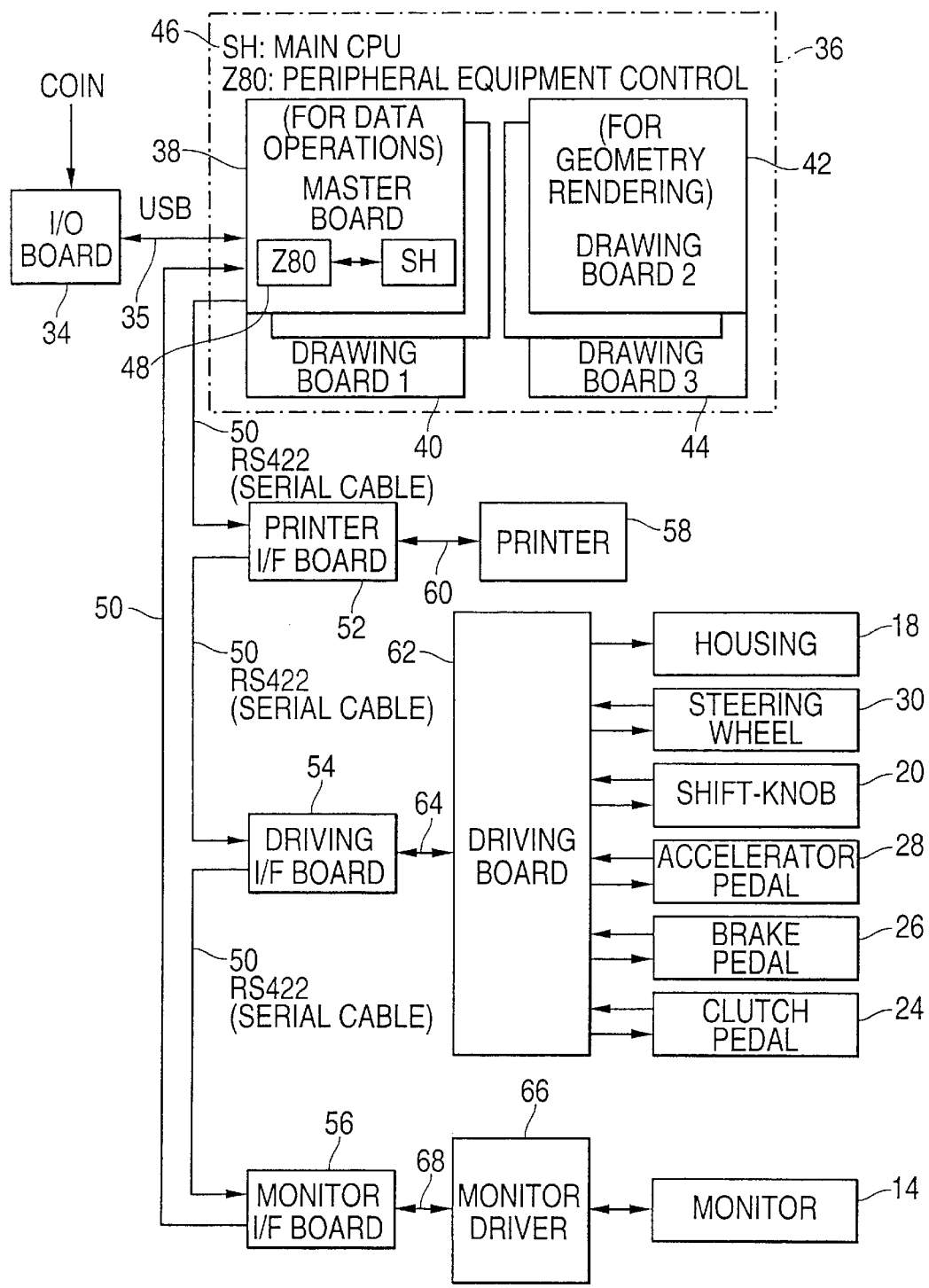
FIG. 2 is a block diagram of the hardware of a control system of a racing game apparatus related to this aspect of an embodiment consistent with the present invention.

FIG. 2 shows the hardware constitution for operating racing apparatus 10. When a coin of a prescribed value is inserted, associated hardware is constituted so that an OK signal is inputted to controller 36 by way of I/O board 34. Furthermore, I/O board 34 and the controller 36 are connected by USB cable 35.

Controller 36 is composed of master board 38 for data operations, and three drawing boards 40, 42, 44 for controlling geometry, rendering and other such graphical operations. The master board 38 comprises a main CPU (symbol SH of FIG. 2) 46, and a peripheral equipment control CPU (symbol Z80 of FIG. 2) 48. Further, in accordance with a serial cable (RS422) 50 from the master board 38, a printer I/F board 52, driving I/F board 54, and monitor I/F board 56 are connected in series, and the final stage monitor I/F board 56 is connected to the master board 38, and sends data from each board to the master board 38.

A printer 58 is connected to the printer I/F board 52 by way of a parallel cable 60 so that a game score is printed out on a form 78 (refer to FIG. 4). A driving board 62 is connected to the driving I/F board 54 by way of a parallel cable 64. This driving board 62 has a function for artificially transmitting to the housing 18, steering wheel 30, shift knob 20, clutch pedal 24, brake pedal 26, and accelerator pedal 28 horizontal G and the reaction (vibration) from a road surface during game driving, and a function for detecting the manipulated variables of the steering wheel 30, shift knob 20, clutch pedal 24, brake pedal 26, and accelerator pedal 28. Monitor driver 66 is connected to the monitor I/F board 56 by a parallel cable 68. Monitor driver 66 performs display control of monitor 14.

FIG. 3 shows a display state of game scores displayed on monitor 14 after playing with racing apparatus 10 with respect to an aspect of one embodiment consistent with the present invention. In the upper portion of monitor 14, title display portion 70 is displayed, to the effect that it is a "RANKING" display. There is an item display field 72 for displaying the ranking order of players' names (a player can select a name from an alphabet, and symbols and numerals), integrated score (time) and a game date. Result display field 76 is constituted so as to link up with the item display field 72.

Result display field 76 is larger than the monitor 14, and is listed by being extended in a downward direction. This means that the area within the chain-line frame of FIG. 3 is displayed on monitor 14 by being sequentially scrolled. That means that during the initial phase of display, the top 10 ranks of the ranking are displayed, and thereafter, the 11th rank, 12th rank, . . . are displayed in order by scrolling, and when the 100th rank is displayed, then the initial 1st rank is displayed.

The displayed ranking goes up to the 100th rank, and the stored game scores are also limited in number to 100. In this case, when the score of the most recent player is worse than the 100th rank, in the past, this most recent game score would not have been stored. However, in this aspect of an embodiment consistent with the present invention, the score of the most recent player is always retained, and is displayed in place of a player, who hitherto had been ranked somewhere in the top 100.

The game score to be replaced is selected on the basis of its being temporally the oldest game score, regardless of the its rank. In accordance with the present invention, the score of the most recent player is always displayed on monitor 14. Furthermore, the ranking is recomputed in accordance with the game score of this most recent player. Further, the constitution is such that the score of this most recent player, and the players ranked in the top 10 are printed out by printer 58 on form 78 (Refer to FIG. 4).

The operation of this aspect of the embodiment will be explained in connection with the flowchart of FIG. 5. In step 100, initialization is performed as soon as the power source is turned ON, and next, in step 102, display and control of a demonstration screen are executed. It is desirable for this demonstration screen to show the traveling state of a typical race car, and to be a screen that is advantageous to playing the game.

In step 104, a determination is made as to whether or not a coin of a prescribed denomination has been inserted, and when this determination is negative, the display of the demonstration screen continues. Here, when there is a positive determination in step 104, that is, when it is determined that a coin of a prescribed denomination has been inserted, processing moves to step 106, the initial screen is displayed, and game mode selection is carried out. In the initial screen, there is displayed a course selection guide, a mode selection guide, and a class selection guide, and a player selects the desired items, respectively.

For example, the selection thereof is done by steering wheel manipulation, and the selected contents are highlighted by concentration difference in accordance with the angle of operation of steering wheel 30. In the case of course selection, when the Fuji Speedway is selected, a portion, in which a plan view of this course is displayed, is highlighted, and, in the highlighted state, selection is completed when accelerator pedal 28 is pressed down. Respective selections are made in this manner, and when all selections are complete, a positive determination is made in step 108, and processing moves to step 110. In step 110, the above-mentioned selected game modes are stored. In the following step 112, game operation control begins. At this point, it is possible to enjoy a game.

When a game-over determination is made, in step 114, a game score is established. (step 116) Next, processing moves to step 120, and a game score is displayed on monitor 14. Next, processing moves to step 122, and a printout is made on form 78. Displayed results are displayed for a prescribed time (step 124), and thereafter, processing returns to step 102, and the demonstration screen is displayed and controlled.

At this point, when a game score was established in step 116, and the game score thereof was displayed on monitor 14 in step 120, in the past, the display number thereof was limited, and if the most recent game score was worse than the limited number of game scores thereof, there were times when the name of this most recent player (to include game results, such as lap time) was not displayed. However, in this aspect of an embodiment consistent with the present invention, control is implemented so that the score of the most recent player is always displayed.

Game score display control of step 120 of FIG. 5 will be explained in detail in connection with the flowchart of FIG. 6.

In step 130, most recent game score data is compared with game score data that has been stored to date, and in step 132, a determination is made as to whether or not this most recent game score data falls within the a ranking of the top 100 scores. When it is determined in step 132 that the most recent game score is within the top 100 (a positive determination), processing moves to step 134, and the most recent game score data is substituted for game score data of the lowest rank (among the stored game score data ranked in the top 100)

Next, in step 136, the ranking is updated, and subsequent thereto, in step 138, display control is performed, that is, the ranking is displayed while being scrolled. Conversely, in step 132, if it is determined that the most recent game score does not fall within the top 100 (a negative determination), processing jumps from step 132 to step 140, and the oldest game score data is retrieved. Next, processing moves to step 142, the most recent game score data is substituted for the retrieved oldest game score data, and processing moves to step 136.

That is, regardless of whether the most recent game score falls within the 100 ranking or not, the most recent game score can always be placed in the ranking, and because even a novice player can confirm his score in the display contents, this player's desire to play another game can be enhanced. Meanwhile, since the deleted game score data is the oldest data, the player, who achieved this game score, can understand, and acquiesce in the deletion because the score was the oldest data.

Furthermore, in this aspect of the embodiment, game score data that was stored at the oldest time is deleted instead of the most recent player's game score, but if this oldest game score data is among the top rankings, interest in a game can be heightened by retaining the highly-ranked game score for the sake of prestige. Accordingly, when the oldest game score data has a high rank (for example, within the top 10 ranks), a game apparatus consistent with the present invention can be constituted such that the next oldest game score data is targeted for deletion. That is, as shown in FIG. 7, steps 144, 146 can be added after step 140. Furthermore, because the other steps are the same as those of FIG. 6, an explanation of the previously explained steps will be omitted.

In Step 144, a determination is made as to whether or not a retrieved oldest game score data falls within the top 10 rankings, and when the determination is positive, a determination is made that this oldest game score should be retained, the next oldest game score data is retrieved in step 146, and processing returns to Step 144. This is repeated, and if the oldest game score outside of the top 10 rankings is retrieved, processing moves to step 142, maintaining the prestige of the best scorers while still heightening the interest of a beginner. Further, as shown in FIG. 8, a game apparatus consistent with the present invention can also be constituted to constantly replace the lowest ranked (100th rank) game score data (Step 134A), update a ranking (Step 136A), and display a ranking (Step 138A).

As explained hereinabove, in this aspect of the embodiment, because the premise is that the game score of the most recent player is always retained, and the constitution is basically such that, so as to be fair to the beginner, skilled player, and regular player alike, consideration is given to whether it is desirable to replace one hitherto stored game score within a ranking of the top 100 scores, and the temporally oldest game score is deleted, the ranking display is not biased toward the skilled player, and can be enjoyed even by a beginner. As explained hereinabove, a game apparatus related to the present invention has the outstanding effect of being able to retain a player's game score, regardless of whether he is a skilled player or a beginner, and of being able to do a ranking under circumstances that are fair to the skilled player and the beginner.

What is claimed is:

1. A game apparatus, comprising:

game score computing means for computing a game score pursuant to game results of a player;

game score storing means for storing a prescribed limited number of game scores computed using said game score computing means, wherein the prescribed limited number of game scores constitute a prescribed ranking; and substituting means for substituting a most recently completed game score for a preexisting game score regardless of whether the most recently completed game score falls within the prescribed ranking, wherein said substituting means further comprises means for determining whether said prescribed limited number of game scores is exceeded when said most recently completed game score is stored by said game score storing means, and means for replacing said preexisting game score with said most recently completed game score based on an age of said preexisting game score, provided the most recently completed game score is determined not to fall within the prescribed ranking.

2. A game apparatus, comprising:

a first memory for storing a game program; and game progress controlling means for controlling progress of a game based on said game program stored in said first memory, said game apparatus including:

game score computing means for computing a game score of said game when a state of said progress of said game satisfies a prescribed condition, game score storing means for storing a prescribed number of game scores computed by said game score computing means, substituting means for substituting a score stored in said game score storing means for a most recently computed game score, when a number of game scores stored in said game score storing means equals said prescribed number of game scores, and ranking means for ranking said stored respective game scores after said substituting means has substituted said most recently computed game score into said game score storing means;

wherein the substituting means further includes means for substituting the most recently computed game score for a preexisting game score chosen from the prescribed number of game scores based on an age of the preexisting game score, provided the most recently computed game score is determined to not fall within a prescribed ranking.

3. A method for ranking game scores, comprising:

computing a game score pursuant to game results of a player;

storing a prescribed limited number of game scores computed in the computing step, wherein the prescribed limited number of game scores constitute a prescribed ranking; and substituting a most recently completed game score for a preexisting game score regardless of whether the most recently completed game score falls within the prescribed ranking, wherein substituting further includes substituting the most recently completed game score for the preexisting game score chosen from the prescribed limited number of game scores based on an age of the preexisting game score, provided the most recently completed game score is determined to not fall within the prescribed ranking.

\* \* \* \* \*